United States Patent
Dunahoo et al.

(10) Patent No.: US 11,654,501 B2
(45) Date of Patent: *May 23, 2023

(54) SYSTEMS AND METHODS FOR GESTURE CONTROL OF A WELDING SYSTEM

(71) Applicant: ILLINOIS TOOL WORKS INC., Glenview, IL (US)

(72) Inventors: Jason Dunahoo, Appleton, WI (US); Seth Michael Gregory, Owasso, OK (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 668 days.

This patent is subject to a terminal disclaimer.

(21) Appl. No.: 16/235,943

(22) Filed: Dec. 28, 2018

(65) Prior Publication Data
US 2019/0193181 A1 Jun. 27, 2019

Related U.S. Application Data

(63) Continuation of application No. 14/502,599, filed on Sep. 30, 2014, now Pat. No. 10,201,868.

(51) Int. Cl.
*B23K 9/095* (2006.01)
*B23K 37/00* (2006.01)
(Continued)

(52) U.S. Cl.
CPC .......... *B23K 9/0953* (2013.01); *B23K 9/0956* (2013.01); *B23K 9/1087* (2013.01);
(Continued)

(58) Field of Classification Search
CPC ........ B23K 9/09; B23K 9/095; B23K 9/0953; B23K 9/0956; B23K 9/10; B23K 9/1087
See application file for complete search history.

(56) References Cited

U.S. PATENT DOCUMENTS

| 4,021,840 A | 5/1977 | Ellsworth |
| 4,577,796 A | 3/1986 | Powers |

(Continued)

FOREIGN PATENT DOCUMENTS

| CA | 2725719 A1 | 6/2012 |
| CN | 1266391 | 9/2000 |

(Continued)

OTHER PUBLICATIONS

"CyberGlove Data Glove: User Guide," CyberGlove Systems LLC, Dec. 2007, http://www.cyberglovesystems.com/support/; http://static1.squarespace.com/static/559c381ee4b0ff7423b6b6a4/t574f4b392eeb81ec9526760f/1464814396021/CyberGloveUserGuid_wired_rev10.pdf.

(Continued)

*Primary Examiner* — Helena Kosanovic
*Assistant Examiner* — Ayub A Maye
(74) *Attorney, Agent, or Firm* — McAndrews, Held & Malloy, Ltd.

(57) ABSTRACT

A motion detection system having detection circuitry, motion recognition circuitry, and communication circuitry is provided. The detection circuitry is configured to detect gestures or motions of a welding system operator. In some embodiments, the detection circuitry is configured to detect gestures or motions of a welding operator via an accessory device, where the accessory device is in wireless communication with the motion detection system. The motion recognition circuitry receives the detected gestures or motions, and translates the detected gestures or motions into a welding command. The welding command is communicated to a welding system via the communications circuitry, and is configured to adjust an operating parameter of the welding system.

20 Claims, 4 Drawing Sheets

(51) Int. Cl.
  *B23K 9/10* (2006.01)
  *B23K 31/02* (2006.01)
  *G06F 3/01* (2006.01)
(52) U.S. Cl.
  CPC .............. *B23K 31/02* (2013.01); *B23K 37/00* (2013.01); *G06F 3/017* (2013.01)

(56) References Cited

U.S. PATENT DOCUMENTS

| | | | |
|---|---|---|---|
| 4,641,292 A | 2/1987 | Tunnell | |
| 4,733,051 A | 3/1988 | Nadeau | |
| 4,776,323 A | 10/1988 | Spector | |
| 4,812,614 A | 3/1989 | Wang | |
| 5,400,722 A * | 3/1995 | Moses | G07C 9/25 109/9 |
| 5,572,102 A | 11/1996 | Goodfellow | |
| 5,923,555 A | 7/1999 | Bailey | |
| 5,932,123 A | 8/1999 | Marhofer | |
| 5,978,090 A | 11/1999 | Burri | |
| 6,103,994 A | 8/2000 | Decoster | |
| 6,209,144 B1 | 4/2001 | Carter | |
| 6,242,711 B1 | 6/2001 | Cooper | |
| 6,271,500 B1 | 8/2001 | Hirayama | |
| 6,337,458 B1 | 1/2002 | Lepeltier | |
| 6,388,422 B1 | 5/2002 | Lew | |
| 6,476,581 B2 | 11/2002 | Lew | |
| 6,516,289 B2 | 2/2003 | David | |
| 6,624,388 B1 | 9/2003 | Blankenship et al. | |
| 6,842,722 B2 | 1/2005 | David | |
| 7,178,932 B1 | 2/2007 | Buckman | |
| 7,457,724 B2 | 11/2008 | Vock | |
| 7,534,005 B1 | 5/2009 | Buckman | |
| 7,559,902 B2 | 7/2009 | Ting | |
| 7,698,101 B2 | 4/2010 | Alten | |
| 7,808,385 B2 | 10/2010 | Zheng | |
| 7,848,860 B2 | 12/2010 | Saposnik | |
| 7,926,118 B2 | 4/2011 | Becker | |
| 7,962,967 B2 | 6/2011 | Becker | |
| 8,099,258 B2 | 1/2012 | Alten | |
| 8,274,013 B2 | 9/2012 | Wallace | |
| 8,316,462 B2 | 11/2012 | Becker | |
| 8,502,866 B2 | 8/2013 | Becker | |
| 8,569,655 B2 | 10/2013 | Cole | |
| 8,599,323 B2 | 12/2013 | Chen | |
| 8,605,008 B1 | 12/2013 | Prest | |
| 8,680,434 B2 | 3/2014 | Stoger | |
| 8,915,740 B2 | 12/2014 | Zboray | |
| 8,957,835 B2 | 2/2015 | Hoellwarth | |
| 8,992,226 B1 | 3/2015 | Leach | |
| 2002/0180695 A1 | 12/2002 | Lawrence | |
| 2005/0233859 A1 | 10/2005 | Takai | |
| 2007/0102479 A1 | 5/2007 | Kan | |
| 2007/0182709 A1 | 8/2007 | Brush | |
| 2007/0187378 A1 | 8/2007 | Karakas | |
| 2008/0038702 A1 * | 2/2008 | Choquet | A61B 5/1124 434/260 |
| 2008/0314887 A1 | 12/2008 | Stoger | |
| 2008/0318679 A1 | 12/2008 | Tran | |
| 2009/0057286 A1 | 3/2009 | Ihara | |
| 2009/0276930 A1 | 11/2009 | Becker | |
| 2009/0298024 A1 | 12/2009 | Batzler | |
| 2010/0035688 A1 | 2/2010 | Picunko | |
| 2010/0154255 A1 | 6/2010 | Robinson | |
| 2010/0223706 A1 | 9/2010 | Becker | |
| 2011/0117527 A1 | 5/2011 | Conrardy | |
| 2011/0220619 A1 | 9/2011 | Mehn | |
| 2011/0316516 A1 | 12/2011 | Schiefermuller | |
| 2012/0012561 A1 | 1/2012 | Wiryadinata | |
| 2012/0050688 A1 | 3/2012 | Wu | |
| 2012/0057240 A1 | 3/2012 | Sundell | |
| 2012/0085741 A1 | 4/2012 | Holverson | |
| 2012/0122062 A1 * | 5/2012 | Yang | G09B 19/003 434/219 |
| 2013/0081293 A1 | 4/2013 | Delin | |
| 2013/0112673 A1 | 5/2013 | Petrilla et al. | |
| 2013/0206740 A1 | 8/2013 | Pfeifer | |
| 2013/0206741 A1 | 8/2013 | Pfeifer | |
| 2013/0208569 A1 | 8/2013 | Pfeifer | |
| 2013/0215281 A1 | 8/2013 | Hobby | |
| 2013/0291271 A1 | 11/2013 | Becker | |
| 2014/0059730 A1 | 3/2014 | Kim | |
| 2014/0069900 A1 | 3/2014 | Becker | |
| 2014/0134579 A1 | 5/2014 | Becker | |
| 2014/0134580 A1 | 5/2014 | Becker | |
| 2014/0184496 A1 * | 7/2014 | Gribetz | G02B 27/017 345/156 |
| 2014/0185282 A1 | 7/2014 | Hsu | |
| 2014/0205976 A1 | 7/2014 | Peters | |
| 2014/0263224 A1 | 9/2014 | Becker | |
| 2014/0272835 A1 | 9/2014 | Becker | |
| 2014/0272836 A1 | 9/2014 | Becker | |
| 2014/0272837 A1 | 9/2014 | Becker | |
| 2014/0272838 A1 | 9/2014 | Becker | |
| 2015/0009316 A1 | 1/2015 | Baldwin | |
| 2015/0072323 A1 | 3/2015 | Postlethwaite | |
| 2015/0125836 A1 | 5/2015 | Daniel | |
| 2015/0129581 A1 * | 5/2015 | Cole | B23K 9/1087 219/60 A |
| 2015/0154884 A1 | 6/2015 | Salsich | |
| 2015/0248845 A1 | 9/2015 | Postlethwaite | |
| 2016/0181499 A1 * | 6/2016 | Denis | B23K 9/1006 219/201 |
| 2017/0326674 A1 * | 11/2017 | Dunbar | A61F 9/06 |

FOREIGN PATENT DOCUMENTS

| | | |
|---|---|---|
| CN | 1633345 | 6/2005 |
| CN | 1665634 | 9/2005 |
| CN | 1780712 | 5/2006 |
| CN | 101068648 | 11/2007 |
| CN | 101108439 | 1/2008 |
| CN | 101352778 | 1/2009 |
| CN | 101422839 | 5/2009 |
| CN | 201249320 | 6/2009 |
| CN | 102971106 | 3/2013 |
| EP | 2022592 A1 | 2/2009 |
| EP | 2082656 A1 | 7/2009 |
| JP | 10305366 | 11/1998 |
| KR | 950003258 | 4/1995 |
| WO | 9934950 | 7/1999 |
| WO | 2005084867 | 9/2005 |
| WO | 2006042572 A1 | 4/2006 |
| WO | 2007009131 | 1/2007 |
| WO | 2008101379 A1 | 8/2008 |
| WO | 2009137379 A1 | 11/2009 |

OTHER PUBLICATIONS

"CyberGlove II Wireless Data Glove: User Guide," CyberGlove Systems LLC, Jul. 2008, http://www.cyberglovesystems.com/support/; https://static1.squarespace.com/static/559c381ee4b0ff7123b6b6a4/t574f4c35b654f98f724d1927/1464814655198/CyberGlovell_UserGuide_2009_0.pdf.

Canadian Office Action Appln No. 2,831,295 dated Nov. 6, 2017 (4 pages).

Canadian Office Action Appln No. 2,831,295 dated Sep. 19, 2018 (5 pages).

Cavilux HF, Laser Light for High-Speed Imaging, See What You Have Missed (2 pages).

Cavilux Smart, Laser Light for Monitoring and High Speed Imaging, Welcome to the Invisible World (2 pages).

Daqri Smart Helmet, The World's First Wearable Human Machine Interface, Brochure (9 pages).

Electronic speckle pattern interferometry Wikipedia, the free encyclopedia (4 pages).

ESAB, "PEK Control panel," pp. 7-8, http://pdfmanuals.esab.com/private/Library/InstructionManuals/0460%20949%20174%20GB.pdf, 2009.

Frank Shaopeng Cheng (2008). Calibration of Robot Reference Frames for Enhanced Robot Positioning Accuracy, Robot Manipu-

(56) References Cited

OTHER PUBLICATIONS lators, Marco Ceccarelli (Ed.), ISBN: 978-953-7619-06-0, InTech, Available from: http://www.intechopen.com/books/robot_manipulators/calibration_of_robot_reference_frames_for_enhanced_r obot_positioning_accuracy (19 pages).

Handheld Welding Torch with Position Detection technology description, Sep. 21, 2011 (11 pages).

Heston, Tim, Lights, camera, lean-recording manufacturing efficiency, The Fabricator, Aug. 2010 (4 pages).

Intelligent Robotic Arc Sensing, Lincoln Electric, Oct. 20, 2014, http://www.lincolnelectric.com/en-us/support/process-and-theory/pages/intelligent-robotic-detail.aspx (3 pages).

Intelligenter SchweiBbrenner, Intelligent Welding Torch, IP Bewertungs AG (IPB) (12 pages).

International Search Report and Written Opinion for PCT/US2016/013867, dated Apr. 28, 2016 (11 pages).

International Search Report for application No. PCT/US2011/043757 dated Nov. 8, 2011.

International Search Report from PCT application No. PCT/US2015/041044, dated Nov. 16, 2015, 15 pgs.

Kevin Dixon, et al., 'Gesture-based Programming for Robotic Arc Welding', Carnegie Mellon University, dated Dec. 6, 2002 (24 pages).

Li, Larry, Time-of-Flight Camera—An Introduction, Technical White Paper, SLOA190B—Jan. 2014, revised May 2014 (10 pages).

Lincoln Electric, "Power Wave Manager user Manual", pp. 26-27, http://lincolnelectric.com/en-za/equipment/Documents/Power-WaveManager.pdf, Jan. 25, 2011.

LiveArc Welding Performance Management System, a reality-based recruiting, screening and training solution, MillerWelds.com 2014 (4 pages).

Lutwak, Dr. Robert, DARPA, Microsystems Tech. Office, Micro-Technology for Positioning, Navigation, and Timing Towards PNT Everywhere and Always, Feb. 2014 (4 pages).

Lutwak, Dr. Robert, Micro-Technology for Positioning, Navigation, and Timing Towards PNT Everywhere and Always Stanford PNT Symposium, Stanford, CA Oct. 29, 2014 (26 pages).

Pamian, Neda et al., Integration of a Multi-Camera Vision System and Strapdown Inertial Naviation System (SDINS) with a Modified Kalman Filter, Sensors 2010,10, 5378-5394; doi: 10.3390/s100605378 (17 pages).

Pipe-Bug, Motorized & Manual Chain Driven Pipe Cutting Machines From Bug-0 Systems (4 pages).

Rivers, et al., Position-Correcting Tools for 2D Digital Fabrication (7 pages).

Wavelength Selective Switching, http://en.wikipedia.org/wiki/wavelength_selective_switching, Mar. 4, 2015 (5 pages).

Windows 10 to Get 'Holographic' Headset and Cortana, BBC News, www.bbc.com/news/technology-30924022, Feb. 26, 2015 (4 pages).

* cited by examiner

SYSTEMS AND METHODS FOR GESTURE CONTROL OF A WELDING SYSTEM

CROSS REFERENCE TO RELATED APPLICATIONS

This application claims priority to, and is a continuation of, co-pending U.S. patent application Ser. No. 14/502,599, entitled "SYSTEMS AND METHODS FOR GESTURE CONTROL OF A WELDING SYSTEM," having a filing date of Sep. 30, 2014, which is incorporated herein by reference in its entirety.

BACKGROUND

The invention relates generally to the field of welding systems, and more particularly to techniques for controlling a component of a welding system with one or more motion detection systems.

BRIEF DESCRIPTION

Welding is a process that has become ubiquitous in various industries for a variety of types of applications. For example, welding is often performed in applications such as shipbuilding, aircraft repair, construction, and so forth. During such welding processes, a variety of control devices are often provided to enable an operator to control one or more parameters of the welding operation. For example, knobs or buttons on a welding system component may be physically manipulated to enable an operator to alter the voltage, amperage, wire feed speed, or any other desired parameter of the welding process. In some situations, however, the operator may be working at a weld location remote from these controls, and returning to these controls each time the operator needs to change the welding parameter wastes valuable time.

In some situations, the operator may control one or more welding parameters of the welding system with wired connections, such as with a wired remote. Unfortunately, the welding environment is often cluttered with many cords, and the wired connections between the components of the welding systems and the operator may introduce additional undesirable clutter. In addition, wired connections may limit the distance of the weld location from the welding power source. Accordingly, there exists a need for improved wireless devices for control of welding power sources.

BRIEF DESCRIPTION

In one embodiment, a motion detection system having detection circuitry, motion recognition circuitry, and communication circuitry is provided. The detection circuitry is configured to detect gestures or motions of a welding system operator. In some embodiments, the detection circuitry is configured to detect gestures or motions of a welding operator via an accessory device, where the accessory device is in wireless communication with the detection circuitry.

In some embodiments, the motion recognition circuitry receives the detected gestures or motions, and compares the detected gestures or motions with a plurality of gestures and motions. Each gesture or motion is associated with a particular welding command. Further, the motion recognition circuitry identifies the welding command from the plurality of welding commands based at least in part on the comparison, and transmits the identified welding command to a component of the welding system.

In some embodiments, the motion recognition circuitry receives the detected gestures or motions and a welding command from a welding operator. Further, the motion recognition circuitry associates the welding command with at least one of the detected gestures or motions, and stores the association for future comparison.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

While only certain features of the invention have been illustrated and described herein, many modifications and changes will occur to those skilled in the art. It is, therefore, to be understood that the appended claims are intended to cover all such modifications and changes as fall within the true spirit of the invention.

Embodiments of the present disclosure are related to a motion detection system disposed in a gesture-based welding system. In particular, the motion detection system detects positions, motions, movements, and/or gestures of a welding operator, and uses the detected motion to control one or more components of the gesture-based welding system. In some situations, the motion detection system may detect gestures or movements of the welding operator with an accessory device that is on the operator. The motion detection system may translate the detected motions into one or more welding command signals that the gesture-based welding system utilizes to change a welding operating parameter. In certain embodiments, the motion detection system includes a local storage (and/or is coupled to a cloud network having a global storage) that includes a library of motions or gestures associated with a particular welding command and/or a type of welding command. Accordingly, the motion detection system may translate the detected motion or gesture into a welding command signal by comparing the detected motion or gesture to information stored within the library. Further, in certain embodiments, the motion detection system includes a configuration mode, which allows an operator to configure (e.g., associate, teach, pair, etc.) a particular position, motion, movement, and/or gesture to a particular welding control command. Such configured gestures may be stored within the gesture library, and may be accessed and retrieved during an operating mode of the motion detection system. With the forgoing in mind, additional details regarding the gesture-based welding system having the motion detection system will be described below with reference to FIGS. 1-5.

Figure 1:
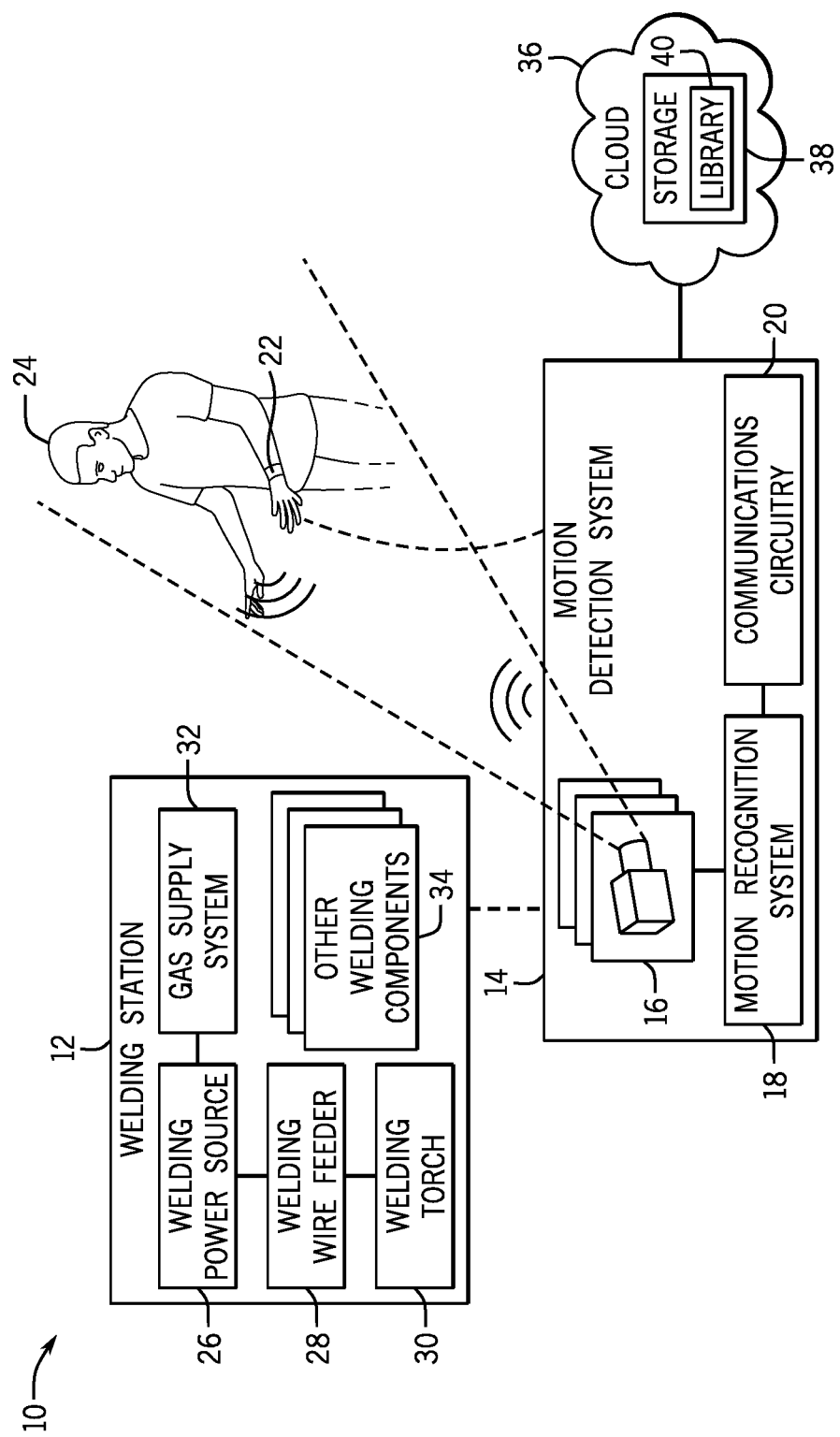
FIG. 1 is a block diagram of a motion detection system operating within a welding system, in accordance with an embodiment.

FIG. 1 is a block diagram of a gesture-based welding system 10 having a welding system 12 and a motion detection system 14, in accordance with an embodiment. The motion detection system 14 includes detection circuitry 16, a motion recognition system 18, and communications circuitry 20. In certain embodiments, the detection circuitry 16 includes an accessory device 22 (e.g., sensors, accelerometers, computing devices, tags, etc. which may be incorporated into a worn device or clothing article) which may be remote from the motion detection system 14, such as disposed on or near a welding operator 24, but may communicate with the motion detection system 14 via wired or wireless systems. As noted above, the motion detected by the motion detection system 14 is translated into one or more command signals that the welding system 12 utilizes to change a welding operating parameter.

The detection circuitry 16 (e.g., sensor system) may include one or more cameras or a sensor system that may detect gestures and/or movements of the welding operator 24. It should be noted that in some situations, the detection circuitry 16 may include the accessory device 22. Further, the detection circuitry 16 may be configured to detect the motion of the accessory device 22. For example, the detection circuitry 16 may capture the movement of a sensor disposed within the accessory device 22. In other situations, the detection circuitry 16 directly detects the gestures and/or movements of the welding operator 24 without the intermediary accessory device 22. For example, the detection circuitry 16 may identify the welding operator and capture the movements of the welding operator (e.g., movement of the welding operator's joints, appendages, etc.). Further, in some situations, the detection circuitry 16 receives motion information from the accessory device 22, which is used to detect the gestures and/or movements of the welding operator 24. For example, the accessory device 22 may detect the movements of the welding operator, such as a blinking of the eye or a pinching of the fingers, and may process and communicate the detected movements to the motion detection system 14.

Accordingly, the detection circuitry 16 may incorporate various types of audio/video detection technologies to enable it to detect the positions, movements, gestures, and/or motions of the welding operator 24. For example, the detection circuitry 16 may include digital cameras, video cameras, infrared sensors, optical sensors (e.g., video/camera), radio frequency energy detectors, sound sensors, vibration sensors, heat sensors, pressure sensors, magnetic sensors, and the like to detect the positions and/or movements of the welding operator 24 and/or to detect the motion of the accessory device 22. Likewise, any of these audio/video detection technologies may also be incorporated into the accessory device 22.

In certain embodiments, the cameras (e.g., digital, video, etc.) may be incorporated with motion-detection components that are triggered by motion, heat, or vibration, and that may be used to detect the motion of the welding operator 24 or the accessory device 22. In certain embodiments, infrared sensors may be utilized to measure infrared light radiating from the welding operator 24 or the accessory device 22 to determine or detect gestures or motions. Further, other types of sensors (e.g., heat, vibration, pressure, sound, magnetic, etc.) may be utilized to detect heat, vibrations, pressures, sounds, or a combination thereof to determine or detect gestures or motions of the welding operator 24 or the accessory device 22. It should be noted that in certain embodiments, a plurality of sensors may be positioned in a variety of locations (on or disposed remote from the motion detection system 14) to determine these parameters, and thereby the motion of the welding operator 24 or the accessory device 22, with greater accuracy. Further, it should be noted that one or more different types of sensors may be incorporated into the detection circuitry 16. For example, a heat sensor may be configured to detect motion of the welding operator 24 or the accessory device 22. In certain embodiments, radio frequency energy sensors may be utilized to detect the motion of the welding operator 24 or the accessory device 22 via radar, microwave, or tomographic motion detection.

The detected positions, gestures, and/or motions received by detection circuitry 16 may be input into the motion recognition system 18 which may translate the detected motions into various welding commands that correspond to the detected motions. After determining the welding command that corresponds to the detected motions, the motion recognition system 18 may send the welding command to the welding system 12 via the communications circuitry 20. The welding system 12, or more particularly, a component of the welding system 12, may implement the welding command. For example, the motion recognition system 18 may receive a detected motion from the detection circuitry 16 and may interpret the detected motion as a command to stop the function of a component of the welding system 12. Further, the communications circuitry 20 may send a signal to the welding system 12 to stop the component of the welding system 12, as desired by the welding operator 24.

The welding system 12 includes various components that can receive the control command signals. The systems and methods described herein may be utilized with a gas metal arc welding (GMAW) system, other arc welding processes (e.g., FCAW, FCAW-G, GTAW (TIG), SAW, SMAW), and/or other welding processes (e.g., friction stir, laser, hybrid). For example, in the illustrated embodiment, the welding system 12 includes a welding power source 26, a welding wire feeder 28, a welding torch 30, and a gas supply system 32. However, it should be noted that in other embodiments, various other welding components 34 can receive the control command signals from the motion detection system 14.

The welding power supply unit 26 generally supplies power to the welding system 12 and other various accessories, and may be coupled to the welding wire feeder 28 via a weld cable. The welding power supply 26 may also be coupled to a workpiece (not illustrated) using a lead cable having a clamp. In the illustrated embodiment, the welding wire feeder 28 is coupled to the welding torch 30 via a weld cable in order to supply welding wire and power to the welding torch 30 during operation of the welding system 12. In another embodiment, the welding power supply 26 may couple and directly supply power to the welding torch 30. The welding power supply 26 may generally include power conversion circuitry that receives input power from an alternating current power source 54 (e.g., the AC power grid, an engine/generator set, or a combination thereof), conditions the input power, and provides DC or AC output power. As such, the welding power supply 26 may power the welding wire feeder 28 that, in turn, powers the welding torch 30, in accordance with demands of the welding system 12. The illustrated welding system 12 includes a gas supply system 32 that supplies a shielding gas or shielding gas mixtures to the welding torch 30.

During the welding processes, a variety of control devices are often provided to enable an operator to control one or more parameters of the welding operation. For example, in some welding systems 12, a control panel is provided with various knobs and buttons that enable the welding operator to alter the amperage, voltage, or any other desirable parameter of the welding process. Indeed, the welding operator may control a wide variety of welding parameters on one or more components of the welding system 12 (e.g., voltage output, current output, a wire feed speed, pulse parameters, etc.). Accordingly, a wide variety of welding parameters may be controlled via detected positions, gestures, and/or motions received by detection circuitry 16, and translated into various welding commands via the motion recognition system 18.

For example, a welding operator may wish to adjust the speed of the wire feed from the weld location. Accordingly, the welding operator may gesture a preset motion that the motion detection system 14 will detect, recognize, and translate into a command for adjusting the wire feed speed. Further, the welding system 12 receives the command, and implements the command to adjust the wire feed speed as desired. In some situations, the operator may implement several successive gestures for a series of commands that operate the welding system 12 in a desired manner. For example, to adjust a voltage output of the welding system 12, the operator may first provide a gesture that is associated with the welding power source 26, and that is indicative of wanting to control a feature of the welding power source 26. Next, the operator may gesture to increase or decrease the voltage output of the welding system 12. In some situations, the motion detection system 12 may translate and store each welding command before communicating the final welding command to the welding system 12. In other situations, the motion detection system 12 may communicate each welding command directly to the welding system 12. Further still, in some embodiments, the motion detection system 12 may receive only one welding command, but may interpret the welding command into one or more control signals. Accordingly, one or more successive control signals may be implemented by the welding system 12, where each control signal is one step of the received welding command.

As noted above, in certain embodiments, the motion detection system 14 is coupled to a cloud network 36 having a storage 38 that includes a library 40 of gestures associated with a particular welding command and/or a type of welding command In particular, the motion recognition system 18 may utilize the cloud 36 to determine one or more welding commands based on motion detected by the detection circuitry 16. The cloud 36 may refer to various evolving arrangements, infrastructure, networks, and the like that are typically based upon the Internet. The term may refer to any type of cloud, including a client clouds, application clouds, platform clouds, infrastructure clouds, server clouds, and so forth. As will be appreciated by those skilled in the art, such arrangements will generally allow for a various number of entities to receive and store data related to welding applications, transmit data to welders and entities in the welding community for welding applications, provide software as a service (SaaS), provide various aspects of computing platforms as a service (PaaS), provide various network infrastructures as a service (IaaS) and so forth. Moreover, included in this term should be various types and business arrangements for these products and services, including public clouds, community clouds, hybrid clouds, and private clouds. In particular, the cloud 36 may be a shared resource accessible to various number of welding entities, and each welding entity (e.g., operator, group of operators, company, welding location, facility, etc.) may contribute welding gestures associated with welding commands, which may be utilized by the motion recognition system 18 at a later time.

Figure 2:
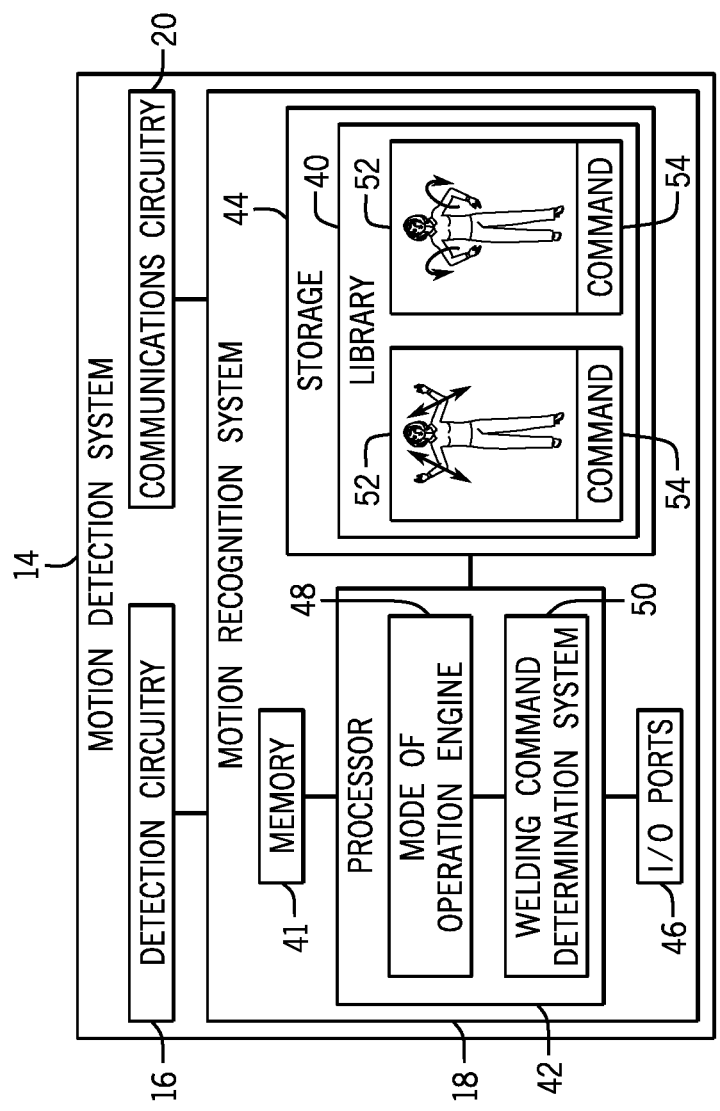
FIG. 2 is a block diagram of the motion detection system of FIG. 1, in accordance with an embodiment.

FIG. 2 is a block diagram of the motion detection system 14 of FIG. 1, in accordance with an embodiment. In particular, the motion detection system 14 includes the detection circuitry 16, the motion recognition system 18, and the communications circuitry 20.

As noted above, the detection circuitry 16 may include may incorporate various types of audio/video detection technologies to enable it to detect the positions, movements, gestures, and/or motions of the welding operator 24 and/or the accessory device 22. Further, the communications circuitry 20 enables wired or wireless communications between the motion detection system 14 and the cloud 36, the welding system 12, and/or the accessory device 22. The motion detection system 14 also includes a memory 41, a processor 42, a storage medium 44, input/output (I/O) ports 46, and the like. The processor 42 may be any type of computer processor or microprocessor capable of executing computer-executable code. The memory 41 and the storage 44 may be any suitable articles of manufacture that can serve as media to store processor-executable code, data, or the like. These articles of manufacture may represent computer-readable media (i.e., any suitable form of memory or storage) that may store the processor-executable code used by the processor 42 to perform the presently disclosed techniques.

The motion recognition system 18 may receive motion and/or gesture data related to the welding operator 24 and/or the accessory device 22 via wired and/or wireless communications. In particular, the motion recognition system 18 interprets the received data to determine the welding commands (e.g., welding control signals) for one or more components of the welding system 12. The memory 41 and the storage 44 may also be used to store the data, the respective interpretation of the data, and the welding command that corresponds to the data within the library 40. The illustrated embodiment depicts the storage 44 of the motion recognition system 18 storing information related to the data and the welding command corresponding to the data (as further described below), but it should be noted that in other embodiments, the memory 41 and/or the cloud 36 (as described with respect to FIG. 1) may be utilized to store the same information.

The library 40 may include a particular type of motion and/or a particular motion (e.g., gesture) and a welding command associated with that motion or type of motion. In some situations, a mode of operation engine 48 within the processor 42 of the motion recognition system 18 may be utilized to change the mode of operation of the motion recognition system 18. For example, the mode of operation engine 28 may be set to an operating mode or a configuration mode. For example, in the configuration mode, the motion recognition system 18 is programmed to associate a particular motion or gesture with a particular welding command. As such, the operator 24 may provide an input to the motion recognition system 18 via the I/O ports 46 indicating a welding command for a particular component of the welding device 12. The welding operator 24 may then position himself in a manner that allows the detection circuitry 16 to detect the particular motion or gestures that the operator 24 intends to be associated with the inputted welding command In particular, the motion recognition system 18 may store the pattern of motion and/or the gesture collected by the detection circuitry 16 within the library 40, and may associate the motion with the respective welding command.

For example, the operator 24 may provide an input to the motion recognition system 18 to enter into the configuration mode and associate a particular motion or gesture with a particular welding command for a particular component of the welding system 12, such as the welding power source 26. After receiving these inputs, the motion recognition system 18 may detect the gestures of the operator 24 such as, for example, holding one arm out straight with a palm out and figures up, while the operator 24 is in the view window of detection circuitry 16. In some embodiments, the operator 24 need not within the view of the detection circuitry 16, but may be wearing the accessory device 22 which may include one or more sensors (e.g., accelerometers) that tracks the motion of the operator 24 and communicates the motion to the detection circuitry 16. In other embodiments, the detection circuitry 16 may be configured to track the movement of the accessory device 22 from the motion recognition system 18, and more specifically, may be tracking the movement of the accessory device 22 and/or one or more sensors disposed within the accessory device 22. Once the motion recognition system 18 detects the motion, the motion recognition system 18 may store the motion and/or gestures as data within the gesture library 40. In particular, the data is associated with the welding command or task, and may be tagged as such within the storage 44 and/or memory 41. In this manner, for example, the operator 24 may configure an upwards motion of the palm of the hand as an gesture associated with increasing the wire speed of the welding system 12. In certain embodiments, the motion recognition system 18 may enter and exit the configuration mode by receiving some input from the operator 24 that does not include any detected motion or gesture. In this case, the configuration mode may be secure and may not be compromised by any inadvertent motions or gestures.

In certain embodiments, the mode of operation engine of the processor 42 of the motion recognition system 18 is set to an operating mode. In the operating mode, the welding operator 24 may be performing a welding task with the welding system 12, and may have the motion detection system 14 enabled. During the welding process, the operator 24 may wish to adjust a welding parameter via one or more gestures or motion. Accordingly, the detection circuitry 16 receives the gesture and/or motion in one of the methods described above, and the welding command is retried from the library 40 based on the detected gestures and/or motions of the operator 24 (or the accessory device 22). For example, if the motion recognition system 18 detects that the operator 24 is moving the palm of her hand in an upwards motion, the motion recognition system 18 may compare the detected motion to the motions or patterns of motion stored in the library 40 and determine that the motion corresponds to increasing the wire speed of the welding system 12.

The library 40 may include a plurality of motions 52 and a corresponding welding command 54 for each motion. The welding commands may include any command to control the welding system 12, and/or components of the welding system 12, such as the welding power source 26, the gas supply system 32, the welding wire feeder 28, the welding torch 30, or other welding components 34 (e.g., grinders, lights, etc.) of the welding system 12. As such, the welding commands may include, but are not limited to, starting a device, stopping a device, increasing a speed or output of a device, decreasing a speed or output of a device, and the like. For example, welding commands related to the gas supply system 32 may include adjusting a gas flow rate. Likewise, welding commands related to the welding wired feeder 28 may include adjusting a welding wire speed, changing between push/pull feeding system, and the like. Further, welding commands related to the welding power source 26 may include varying a voltage or power routed to the welding torch 30. Moreover, the library 40 may include other commands associated with various motions such as disabling the motion recognition system 18, limiting the control or ability of an operator to engage with the motion recognition system 18, or the like.

Figure 3:
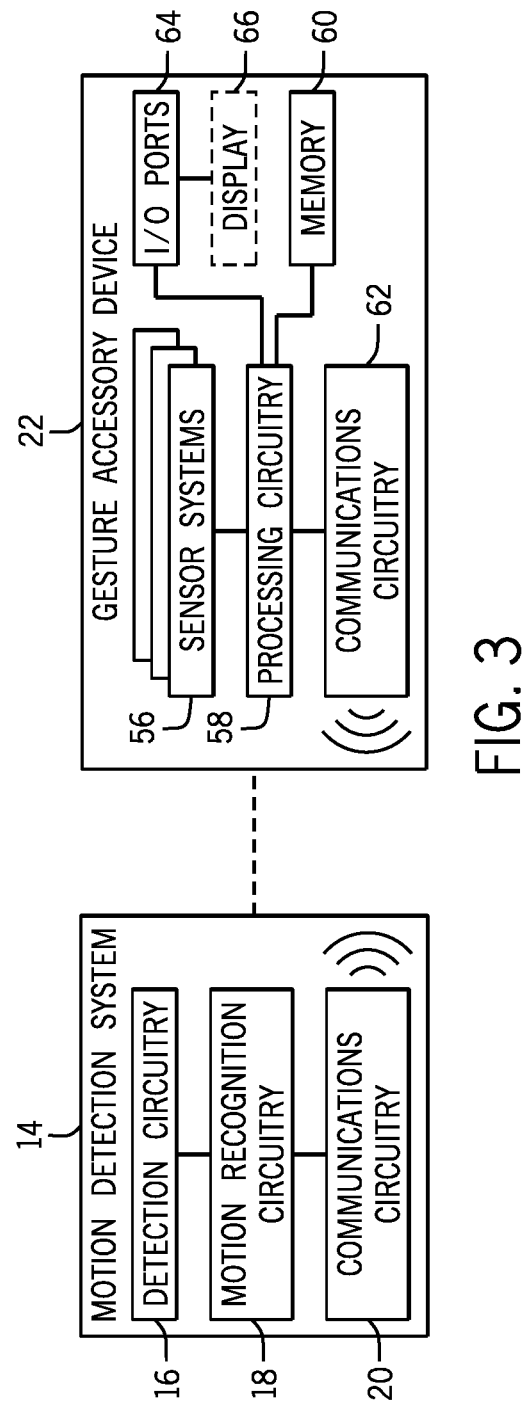
FIG. 3 is a block diagram of the motion detection system of FIG. 1, in wireless communication with a gesture accessory device, in accordance with an embodiment.

FIG. 3 is a block diagram of the motion detection system 14 of FIG. 1, operatively coupled to the accessory device 22, in accordance with an embodiment. In particular, in certain embodiments, the accessory device 22 may in wired or wireless communication with the motion detection system 14.

In some embodiments, the detection circuitry 16 may include the accessory device 22. Further, the detection circuitry 16 may be configured to directly track the movement of the accessory device 22 and/or one or more sensors disposed within the accessory device 22 from the motion detection system 14. Specifically, the accessory device 22 may include sensors 56 (e.g., infrared, optical, sound, magnetic, vibration, etc.), accelerometers, computing devices, smart phones, tablets, GPS devices, wireless sensor tags, one or cameras, or the like that are configured to aid the detection circuitry 16 in detecting the motion and/or gestures of the operator 24. In some situations, the accessory device 22 may be incorporated into a clothing article that is worn, disposed, or carried by the operator 24 (e.g., bracelet, wristlet, anklet, necklace, etc.), or may be a device that is held by the operator 24.

In some situations, the sensor systems 56 are configured to gather gesture and/or motion data from the operator 24, similar in manner to the detection circuitry 16. The motion and/or gesture data gathered may be digitized via one or more processors within processing circuitry 58, which may also be associated with a memory 60. The processing circuitry 58 may be any type of computer processor or microprocessor capable of executing computer-executable code. The memory 60 may be any suitable articles of manufacture that can serve as media to store processor-executable code, data, or the like. These articles of manufacture may represent computer-readable media (i.e., any suitable form of memory or storage) that may store the processor-executable code used by the processing circuitry to perform the presently disclosed techniques. Further, the digitized data may be communicated via wired and/or wireless communications circuitry 62 to the motion detection system 14. As noted above, the motion recognition system 18 interprets the received data to determine the welding commands (e.g., welding control signals) for one or more components of the welding system 12, and transfers the welding commands to the welding system 12 via the communications circuitry 20 of the motion detection system 14. It should be noted that the communications between the components of the gesture-based welding system 10 might be over secure channels.

In some embodiments, the communications circuitry 62 of the gesture accessory device 22 also communicates with the welding system 12. For example, the gesture accessory device 22 may be paired with the welding device 22 before welding operations are commenced, to ensure that the gestures provided by the operator 24 are securely intended for the paired devices. In this manner, though a plurality of gesture accessory devices 22 are proximate to the welding system 12, only the paired device 22 is able to provide gesture commands to the welding system 12 via the motion detection system 14.

Further, in some embodiments, the accessory device 22 may include I/O ports 64 that enables the operator 24 to provide inputs to the motion detection system 14. The inputs may include methods to pair the accessory device 22 with the welding system 12 and/or the motion detection system 14, and may also be utilized by the operator 24 to input identification information and/or welding related information. In some embodiments, the accessory device 22 includes a display 66 that enables an operator 24 to visualize the welding commands sent by the motion detection system 14 to the welding system 12. Further, the display 66 may be utilized to receive and display various welding related information from the welding system 12, such the status of the current operating parameters, the status of welding commands (e.g., control signals) sent to the welding system 12, the status of a wireless connection, whether or not the welding commands were implemented, error or alerts, or generally any information related to the gesture-based welding system 10.

Figure 4:
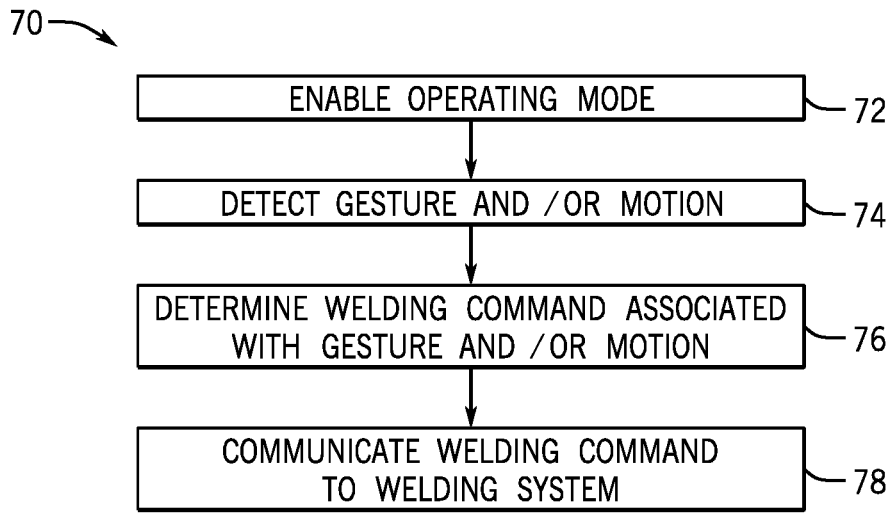
FIG. 4 is a flow chart of a method for communicating a welding command to a welding system from the motion detection system of FIG. 1, in accordance with an embodiment.

FIG. 4 is a flow chart of a method 70 for communicating a welding command to the welding system 12 from the motion detection system 14 of FIG. 1, in accordance with an embodiment. The method 70 includes enabling an operating mode of the motion detection system 14 on the mode of operation engine 48 via the I/O ports 46 (block 72). In this manner, the motion detection system 14 may be configured to detect a motion and/or gesture and utilize the gesture library 40 to translate the detected motion and/or gesture into a welding command.

Accordingly, the method 70 includes detecting the gesture and/or motion (block 74). As noted above, the detection circuitry 16 may include may incorporate various types of audio/video detection technologies to enable it to detect the positions, movements, gestures, and/or motions of the welding operator 24 and/or the accessory device 22. Further, the method 70 includes determining a welding command that is associated with the detected motion and/or gesture (block 76). For example, the motion recognition system 18 interprets the received data to determine the welding commands (e.g., welding control signals) for one or more components of the welding system 12. The welding command may be determined by comparing the received data with data within the gesture library 40.

In addition, the method 70 includes communicating the welding command to the welding system 12 (block 78). The welding commands may include any command to control the welding system 12, and/or components of the welding system 12, such as the welding power source 26, the gas supply system 32, the welding wire feeder 28, the welding torch 30, or other welding components 34 of the welding system 12. In this manner, the gesture and/or motion provided by the operator 24 and/or the accessory device 22 may be utilized to control one or more welding parameters of the welding system 12.

Figure 5:
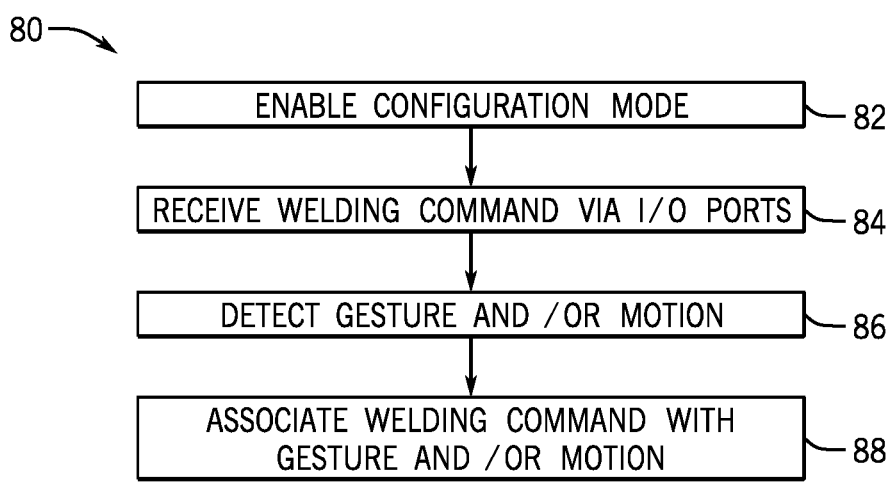
FIG. 5 is a flow chart of a method for associating a welding command with a particular gesture or motion, in accordance with an embodiment.

FIG. 5 is a flow chart of a method 80 for associating a particular welding command with a particular gesture and/or motion, in accordance with an embodiment. As noted above, the motion detection system 14 may be configured in an operating mode to detect a motion and/or gesture and utilize the gesture library 40 to translate the detected motion and/or gesture into a welding command. The illustrated method 80 includes enabling a configuration mode (e.g., learning, pairing, association, etc.) of the motion detection system 14 on the mode of operation engine 48 via the I/O ports 46 (block 82). In this manner, the motion detection system 14 may be configured to associate and store within the memory 41 and/or the storage 44 a particular motion or gesture with a particular welding command.

In addition, the method 80 includes the motion detection system 14 receiving a welding command that the operator 24 wishes to set a gesture and/or motion for via the I/O ports 46 (block 84). The welding command may be for any component of the welding system 12, as discussed above. The welding operator 24 may then position himself in a manner that allows the detection circuitry 16 of the motion detection system 18 to detect the particular motion or gestures that the operator 24 intends to be associated with the inputted welding command (block 86). Further, the method 80 includes the motion recognition system 18 storing the motion and/or the gesture collected by the detection circuitry 16 within the library 40, and associating the motion with the respective welding command (block 88). It should be noted that such associations may be made and stored within the library 40 of the cloud network 36, and retrieved by the local systems as desired. In some situations, the pre-associated global welding commands may be overwritten with local welding commands that are more personal to the welding operator 24.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for controlling a welding system, comprising:
a sensor system configured to be directed at a welding system operator and detect a first gesture or motion of the welding system operator, as well as a second gesture or motion of the welding system operator; and
processing circuitry communicatively coupled to the sensor system, wherein the processing circuitry is configured to:
receive a first signal representative of the first gesture or motion detected by the sensor system,
receive a second signal representative of the second gesture or motion detected by the sensor system,
perform a first comparison of the first signal with a plurality of stored component signals, the plurality of stored component signals having first associations with a plurality of welding components, and each stored component signal of the plurality of stored component signals being representative of a first particular gesture or motion,
identify a welding component, but not any welding command, from the plurality of welding components, based on the first comparison,
perform a second comparison of the second signal with a plurality of stored command signals, the plurality of stored command signals having second associations with a plurality of welding commands, and each stored command signal of the plurality of stored command signals being representative of a second particular gesture or motion,
identify a welding command from the plurality of welding commands based at least in part on the second comparison, and
transmit the welding command to the welding component.

2. The system of claim 1, wherein the sensor system comprises a camera sensor, infrared sensor, optical sensor, radio frequency energy sensor, sound sensor, or heat sensor.

3. The system of claim 1, further comprising a user interface configured to receive selection of a configuration mode or an operation mode, the operation mode comprising a first mode in which the processing circuitry is configured to translate the second gesture or motion detected by the sensor system into the welding command, and the configuration mode comprising a second mode in which the processing circuitry is configured to create, in a gesture library, an association between the second gesture or motion detected by the sensor system and the welding command.

4. The system of claim 1, wherein the sensor system comprises a motion activated camera.

5. The system of claim 1, wherein the plurality of stored component signals, first associations with the plurality of welding components, plurality of command signals, and second associations with the plurality of welding commands are stored in a gesture library within a cloud storage system that is in communication with, and remote from, the processing circuitry.

6. The system of claim 1, further comprising a wearable accessory device having a display screen configured to display the welding command.

7. The system of claim 1, wherein the welding component of the welding system comprises a welding power source, a welding wire feeder, a welding torch, or a gas supply system.

8. The system of claim 7, wherein the welding command comprises a command to start the component of the welding system, stop the component of the welding system, or adjust a wire feed speed, type of feeding, voltage, power output, or gas flow rate of the component of the welding system.

9. A method for controlling a welding system, comprising:
  detecting, via a sensor system directed at a welding operator, a first gesture or motion of the welding operator, and a second gesture or motion of the welding operator;
  identifying, via processing circuitry, a welding component of the welding system, but not any welding command, based on a first comparison of the first gesture or first motion with a plurality of stored component gestures or motions, each of the stored component gestures or motions being associated with a particular welding component;
  detecting, via the sensor system, a second gesture or second motion of the welding operator;
  identifying, via processing circuitry, a welding command corresponding to the second gesture or second motion detected by the sensor system based on a second comparison of the second gesture or second motion with a plurality of stored command gestures or motions, each stored command gesture or motion of the plurality of stored command gestures or motions being associated with a stored welding command; and
  communicating the welding command to the welding component of the welding system, wherein the welding system is configured to implement the welding command.

10. The method of claim 9, wherein the sensor system comprises a camera sensor, infrared sensor, optical sensor, radio frequency energy sensor, sound sensor, or heat sensor.

11. The method of claim 9, wherein the sensor system comprises a motion activated camera.

12. The method of claim 9, wherein the welding component of the welding system is configured to implement the welding command.

13. The method of claim 12, wherein the welding command comprises a command to start the welding component, stop the welding component, or adjust a wire feed speed, type of feeding, voltage, power output, or gas flow rate of the welding component.

14. The method of claim 12, wherein the welding component comprises a welding power source, a welding wire feeder, a welding torch, or a gas supply system.

15. The method of claim 9, wherein the plurality of stored component gestures or motions, or the plurality of stored command gestures or motions, are stored on a cloud storage system.

16. A system, comprising:
  a sensor system configured to be directed at a welding system operator and detect a first gesture or motion of the welding system operator, as well as a second gesture or motion of the welding system operator;
  a gesture library comprising
    a plurality of stored component signals, each stored component signal of the plurality of stored component signals being representative of a first particular gesture or motion, and the plurality of stored component signals having first associations with a plurality of welding components and
    a plurality of stored command signals, each stored command signal of the plurality of stored command signals being representative of a second particular gesture or motion, and the plurality of stored command signals having second associations with a plurality of welding commands; and
  processing circuitry communicatively coupled to the sensor system and the gesture library, wherein the processing circuitry is configured to:
    receive a first signal representative of the first gesture or motion detected by the sensor system,
    receive a second signal representative of the second gesture or motion detected by the sensor system,
    perform a first comparison of the first signal with the plurality of stored component signals,
    identify a welding component, but not any welding command, from the plurality of welding components, based on the first comparison,
    perform a second comparison of the second signal with the plurality of stored command signals,
    identify a welding command from the plurality of welding commands based at least in part on the second comparison, and
    transmit the welding command to the welding component.

17. The system of claim 16, wherein the sensor system comprises a camera sensor, infrared sensor, optical sensor, radio frequency energy sensor, sound sensor, or heat sensor.

18. The system of claim 16, wherein the sensor system comprises a motion activated camera.

19. The system of claim 16, wherein the welding component comprises a welding power source, a welding wire feeder, a welding torch, or a gas supply system.

20. The system of claim 19, wherein the welding command comprises a command to start the welding component of the welding system, stop the welding component, or adjust a wire feed speed, type of feeding, voltage, power output, or gas flow rate of the welding component.

* * * * *